US005182767A

United States Patent [19]

Bernard

[11] Patent Number: 5,182,767

[45] Date of Patent: Jan. 26, 1993

[54] ELECTRONIC TELEPHONE DEVICE

[76] Inventor: Alain Bernard, 5 rue Jules Simon, 75015 Paris, France

[21] Appl. No.: 680,551

[22] Filed: Apr. 4, 1991

[30] Foreign Application Priority Data

Apr. 5, 1990 [FR] France ................................ 90 04367

[51] Int. Cl.$^5$ .............................................. H04M 1/26

[52] U.S. Cl. ..................................... 379/355; 379/418

[58] Field of Search ............... 379/354, 355, 356, 357, 379/216, 352, 353, 418; 340/825.31

[56] References Cited

U.S. PATENT DOCUMENTS

| | | | |
|---|---|---|---|
| 4,126,768 | 11/1978 | Grenzon | 379/357 |
| 4,677,657 | 6/1987 | Nagata et al. | 379/357 |
| 4,817,135 | 3/1989 | Winebaum | 379/355 |
| 4,941,172 | 7/1990 | Winebaum et al. | 379/352 |
| 4,980,910 | 12/1990 | Oba et al. | 379/354 |
| 4,988,987 | 1/1991 | Barrett et al. | 340/825.31 |
| 4,995,077 | 2/1991 | Malinowski | 379/355 |

FOREIGN PATENT DOCUMENTS

| | | |
|---|---|---|
| 0061373 | 2/1983 | European Pat. Off. . |
| 61-43050 | 3/1986 | Japan . |

*Primary Examiner*—James L. Dwyer
*Assistant Examiner*—Stella L. Woo
*Attorney, Agent, or Firm*—Oblon, Spivak, McClelland, Maier & Neustadt

[57] ABSTRACT

The device includes an acoustic transmitter (10), a tone generator (12), a memory (14) containing an identification code (N) and a service key (C), and an electronic circuit (16). A digital message transmitted depends on N and C and changes with each use. The time limitation moment of the device is determined. The device appears in the form of a token.

8 Claims, 1 Drawing Sheet

ELECTRONIC TELEPHONE DEVICE

FIELD OF THE INVENTION

The present invention concerns an electronic telephone device. Its general flat round shape resembles a "token".

BACKGROUND OF THE INVENTION

The invention can in particular be applied in telephone service payment systems, such as in the system referred to the patent application filed by Alain BERNARD on the data of filing the present application and entitled "Telephone service payment system".

There already exist acoustic coupler modems able to transmit sounds via a small speaker. This speaker, similar to the microphone of a telephone handset, allows for the transmission of these sounds onto the telephone network. Another modem, situated at the other extremity of the link, interprets the data it receives and establishes a connection with, for example, a computer.

The CCITT (Comité Consultatif International Télégraphic et Téléphonic=The International Telegraph and Telephone Consultative Committee) defined in its notice Q23 a set of tones corresponding to the twelve figures and signs of the telephone keypad and thus it is possible to transmit these figures and signs with the aid of such modems.

Thus, there are a large number of models of boxes resembling pocket calculators making it possible to store telephone numbers and transmit them onto the telephone network.

In another sphere of application, there are numbering devices making it possible to add to a digital signal a set of time-evolving pseudo-random data so that the initial digital signal is only able to be located by virtue of knowing the set of data and its time evolution.

Finally, the identification of a person calling a computer connected to the telephone network is currently effected by asking this person to type a code number on the keypad.

One example of this prior art is cited in the document U.S. Pat. No. 4,601,011 which describes a device including means able to form a digital message once the correct secret code has been typed on the keypad. This message changes over a certain period of time by virtue of a counter whose contents are increased by increments on each use. These contents partly determine the digital message sent onto the telephone line.

Although satisfactory in certain respects, the identification of a person by means of a code number does exhibit a certain number of drawbacks as the code may be stolen. The other devices are complex and take up a large amount space, especially when they require a keypad. In the best of cases, the spatial requirement is reduced to the size of a pocket calculator. Furthermore, they are ill-adapted to define a period of validity or, if one prefers, a time limitation date.

SUMMARY OF THE INVENTION

The object of the present invention is to overcome these drawbacks. To this end, it concerns a device which is easy to use and with an extremely simple structure, without a keypad and able to transmit a time-evolving digital message, this device being able to itself determine the moment when it is has expired so as to definitively have it rendered out of service.

More precisely, the present invention concerns an electronic telephone device including:

an acoustic transmitter, a generator for controlling an acoustic transmitter and able to generate tones falling with the telephone band, wherein this device further includes:

a) a device able to form a digital message formed of a set of numbers changing on each use of the device, this device also being able to determine a time limitation instant and including:

a memory containing a first identification code and a second or service key code linked to the telephone system in which the device is used;

an electronic and logic circuit connected to the memory and delivering the message controlling the generator, this message depending on the first and second codes, each number of the message controlling the generator so as to have the acoustic transmitter transmit a particular tone, this transmitter thus transmitting a sequence of tones;

b) a battery able to feed to device able to form the message;

c) a manually controlled switch able to put the generator into service so as to transmit the tone sequence.

According to one embodiment, the device is characterized in that the device includes a clock giving the date and determining the device time limitation instant, the message thus depending on the first and second codes and the date indicated by the clock.

According to a second embodiment, the device is characterized in that the device includes a counter whose contents are increased by increments on each use, the message thus depending on the first and second codes and the contents of the counter.

Preferably, all the means comprising the device of the invention are sealed in a block of a solid material having the shape of a token. The switch is disposed on one of the faces of the token and the loud-speaker on the other.

The material used to constitute the block is preferably a resin or plastic material.

When the device includes a clock, at the time the token is embodied, all the clocks of the various tokens are set and synchronized in relation to a reference clock.

BRIEF DESCRIPTION OF THE DRAWINGS

The characteristics and advantages of the invention shall appear more clearly from a reading of the following description relating to an embodiment example, given by way of explanation and being non-restrictive, with reference to the accompanying drawings on which.

DETAILED DESCRIPTION OF THE PREFERRED EMBODIMENTS

Figure 1:
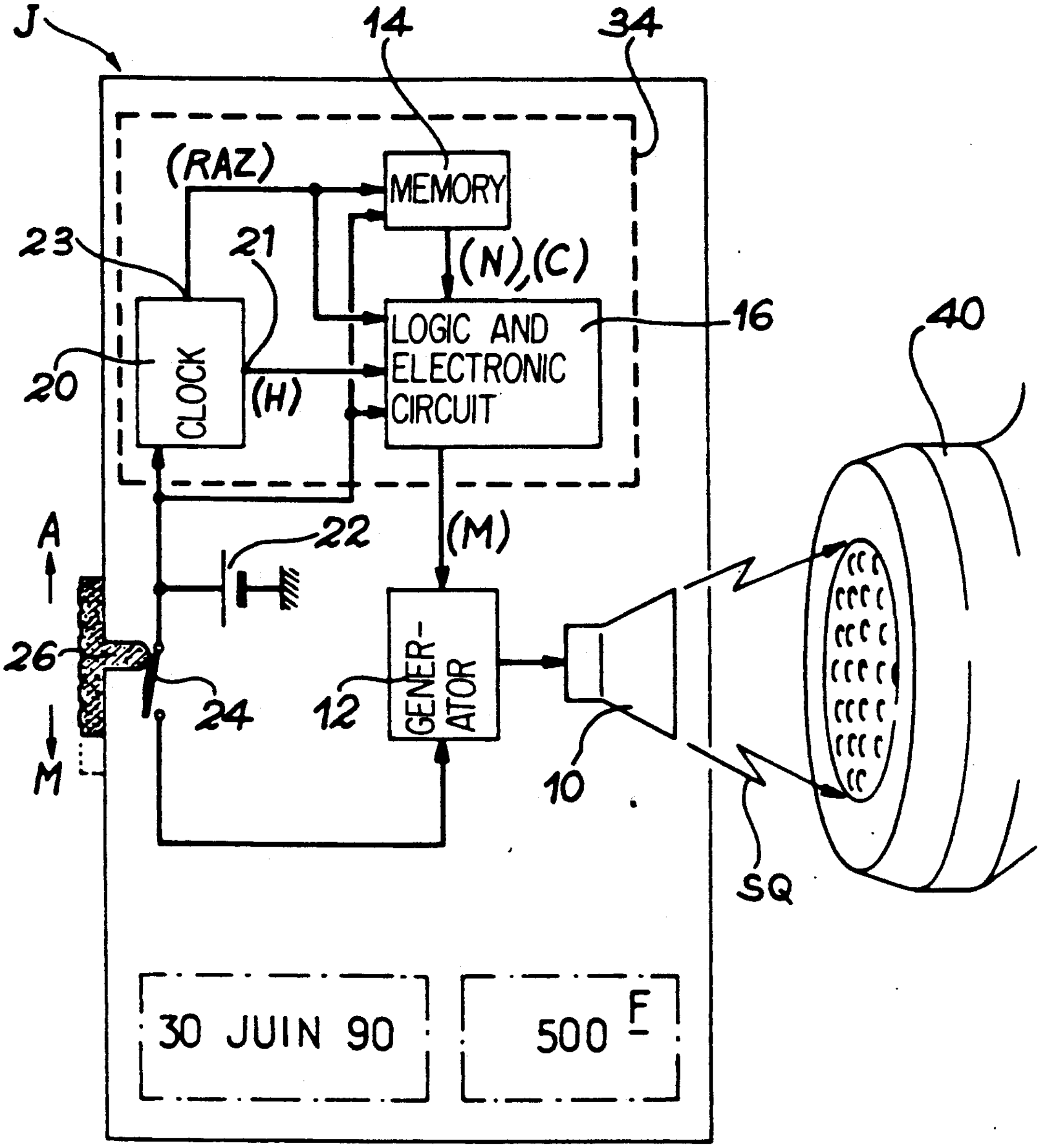
FIG. 1 shows an electronic diagram of the device.

As shown on FIG. 1, the device J includes: an acoustic transmitter 10 controlled by a generator 12 (which may be a 300 baud modem or a multifrequency tone generator as per norm Q23), a memory 14, that is preferably a RAM memory losing its contents in the event of power stoppage, and a logic and electronic circuit 16 connected to the memory 14 and controlling the circuit 12. In the variant shown, the device further includes a clock 20 giving the date H (for example, in minutes), and a battery 22 continuously feeding the clock 20 and the memory 14 but only the generator 12 if a switch 24 has been closed via the effect of a particular device, such as a push-button 26 (or any other equivalent device).

The clock 20 is a circuit which firstly gives the time elapsed reckoned in, for example, minutes from the date of origin of the device, and secondly determines the time left to run until the time limitation date. The clock 20 may be constituted by a time base connected firstly to a minute counter, the contents H of this counter appearing on one outlet 21, and secondly connected to a minute down-counter, the movement to zero of this down counter being expressed with the appearance of a RAZ resetting signal on an outlet 23.

Other embodiments are possible and available to experts in this field, these embodiments including counting devices whose counter is increased by increments. The essential factor is to obtain information (data and number of uses) making it possible to record the time limitation moment and modify the transmitted sequence.

With a clock and by way of example if the date is recorded in minutes, a period of 10 years represents 5,256,000 minutes which requires 7 figures (from 0 to 9). The period of life of a token may be 6 months, namely 262,800 minutes.

The memory 14 contains a first code, that is the identification code of the token. This concerns a number N introduced, at the time of producing the token, by a software or by masking an integrated circuit or by programming. The memory 14 also contains a second code or key C, which is part of the overall telephone system in which the token is used. Of course, the memory 14 may be made up of two independent memories, one of them storing the first code and the other storing the second code.

The logic and electronic circuit 16 thus has at its disposal the date H delivered by the clock 20, the identification code N and the key C belonging to the overall system. The circuit 16 then generates a digital message M which is a function of H, N and C. Any technician is familar with algorithms for forming such messages. The document U.S. Pat. No. 4,601,011 cited above and the library reference it contains describe means able to implement such algorithms and, at the other line extremity, means able to run off inverse algorithms. Thus, it is not necessary to provide the details of these circuits.

By way of example, it merely suffices to state that the number N may comprise 8 figures (from 0 to 9-, which represents 100 million possible tokens; the key C may also comprise 8 of these; in addition, it is possible to use 4 control figures (for example, the sum of each of the numbers H, N and C and the sum of all these numbers). Thus, a message of $7+8+8+4=27$ figures is obtained. Converted according to the norm Q23, these 27 figures shall be transmitted in about 2.7 seconds.

Purely by way of example, the sequence constituting the message may thus be: 7 figures for the data H, 1 control figure for the sum at 9 of the preceding figures, 8 figures for the number N, 1 control figure for the sum at 9 of the preceding figures and 1 figure for the sum at 9 of the three control figures.

Of course, much more complex sequences may be formed with the aid of all known crypting algorithms without departing from the context of the invention.

When the message M is formed, the generator 12 accordingly controls the loud-speaker 10 which transmits a sequence SQ formed from a set of tones.

When the clock 20 detects the time limitation moment, the RAZ resetting signal places the memory 14 and/or the circuit 16 out of operation. The token is then unable to be used.

Most circuits (clock, memory, logic circuit), shown separated from one another on the accompanying drawing for the sake of clarity, may be integrated in one and the same circuit. Similarly, the functions fulfilled by these circuits may be obtained via the programming of a more high-performing circuit, such as a microprocessor or a controller.

In practice, all the means shown may be mouled in a resin or a plastic material so as to have the aspect of a token. The push-button then appears on one of the faces of the token, the acoustic transmitter being disposed on the other face. When functioning, the token J is clad onto the microphone 40 of a telephone handset.

Figure 2:
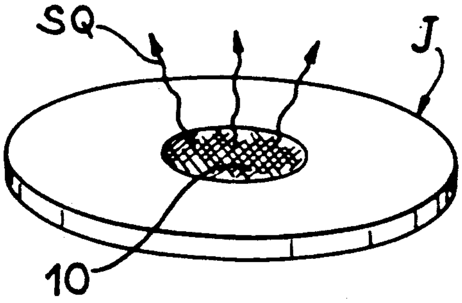
FIG. 2 shows the general aspect of the token.

FIG. 2 shows the general aspect of the token J of the invention and seen via the front face where the loudspeaker 10 is disposed transmitting the sound sequence SQ (the rear face unable to be seen corresponds to the push-button 5).

What is claimed is:

1. Electronic device for a telephone system, comprising:

an acoustic transmitter;

an acoustic generator for controlling the acoustic transmitter and able to generate tones falling within the telephone band;

a digital message generation means for generating a digital message which consists of a set of numbers, wherein said set of numbers changes on each use of said electronic device, and wherein said digital message generation means includes means to determine a time limitation moment, said digital message generation means comprising:

a memory containing a first identification code and a second code of a service key linked to the telephone system in which the device is used;

an electronic and logic circuit connected to the memory, for delivering a message controlling the generator, this message depending on the first and second codes, wherein each number of the message controls the generator so as to have the acoustic transmitter transmit a particular sequence of tones;

a battery able to power the device; and a manually controlled switch able to put the acoustic generator into service so as to transmit the sequence of tones.

2. Device according to claim 1, wherein said digital message generation means includes a clock giving the date, the message thus depending on the first and second codes and on the date indicated by the clock.

3. Device according to claim 1, wherein said digital message generator means includes a counter whose contents are increased by increments on each use, the message thus depending on the first and second codes and the contents of the counter.

4. Device according to claim 1, wherein all the means composing the device are sealed in a solid block and have the shape of a token.

5. Device according to claim 4, wherein the block is made of resin or plastic.

6. Device according to claim 1, wherein the tones transmitted by the generator are multifrequency type tones.

7. Device according to claim 2, wherein:

said clock determines a time limitation moment.

8. A communication security device for generating and transmitting security codes, wherein each security code is keyed to one of a plurality of receiving systems, comprising:

a security code generator means for generating sets of security code numbers, comprising a memory containing a first identification code and a second code corresponding to one of the plurality of receiving systems, and a logic circuit for controlling generation of the sets of security code numbers based upon the first and second codes, wherein each set corresponds to a security code, a transmitter means for transmitting a first set of security code numbers corresponding to a first security code and generated by said security code generator means, wherein the security code generator means generates a security code after transmission of the first security code and which is different from the first security code so that the next security code transmitted after transmission of the first security code is different from the first security code.

* * * * *